US008839615B2

(12) United States Patent
Garvey

(10) Patent No.: US 8,839,615 B2
(45) Date of Patent: Sep. 23, 2014

(54) POWER CONVERSION

(75) Inventor: Seamus Dominic Garvey, University Park (GB)

(73) Assignee: The University of Nottingham, University Park, Nottingham (GB)

( * ) Notice: Subject to any disclaimer, the term of this patent is extended or adjusted under 35 U.S.C. 154(b) by 1277 days.

(21) Appl. No.: 12/306,317

(22) PCT Filed: Jul. 3, 2007

(86) PCT No.: PCT/GB2007/002477
§ 371 (c)(1),
(2), (4) Date: Dec. 22, 2009

(87) PCT Pub. No.: WO2008/003950
PCT Pub. Date: Jan. 10, 2008

(65) Prior Publication Data
US 2010/0107621 A1    May 6, 2010

(30) Foreign Application Priority Data

Jul. 4, 2006  (GB) .................................. 0613249.2
Jul. 14, 2006 (GB) .................................. 0614005.7
Jul. 19, 2006 (GB) .................................. 0614322.6

(51) Int. Cl.
*F03D 1/06* (2006.01)
*F03D 9/00* (2006.01)

(52) U.S. Cl.
CPC ............... *F03D 9/001* (2013.01); *Y02E 10/725* (2013.01); *Y02E 10/721* (2013.01); *F03D 1/065* (2013.01); *F05B 2260/40* (2013.01)
USPC ........................................................... 60/398

(58) Field of Classification Search
USPC ........................................................... 60/398
See application file for complete search history.

(56) References Cited

U.S. PATENT DOCUMENTS

| 3,996,741 | A | * | 12/1976 | Herberg | .......................... | 60/398 |
| 4,041,708 | A | * | 8/1977 | Wolff | .............................. | 60/649 |
| 4,147,204 | A | * | 4/1979 | Pfenninger | ..................... | 60/398 |
| 4,710,100 | A | * | 12/1987 | Laing et al. | .................... | 60/398 |
| 2006/0266034 | A1 | * | 11/2006 | Ingersoll | ..................... | 60/641.1 |

FOREIGN PATENT DOCUMENTS

| DE | 20019832 U1 | 2/2001 | |
| EP | 0853197 A | 7/1998 | |
| WO | WO2006017888 A | 2/2006 | |
| WO | WO 2006017888 A1 * | 2/2006 | .............. F25B 27/00 |

* cited by examiner

Primary Examiner — Thomas E Lazo
(74) Attorney, Agent, or Firm — Shumaker, Loop & Kendrick, LLP

(57) ABSTRACT

A wind energy converter 10 comprises a horizontal axis wind turbine 12 including a plurality of blade members 14 rotatable about a generally horizontal axis. A mass member 16 is movable along the or each blade member 14 under the action of radial forces induced by rotation of the blade members 14 and under the action of gravitational force, and movement of the or each mass member 16 is arranged to provide for conversion of the wind energy. Also described is a power generating system 200, 240 including a heat recovery arrangement 216, comprising a heat exchanger arrangement 218 and an expander 222.

15 Claims, 7 Drawing Sheets

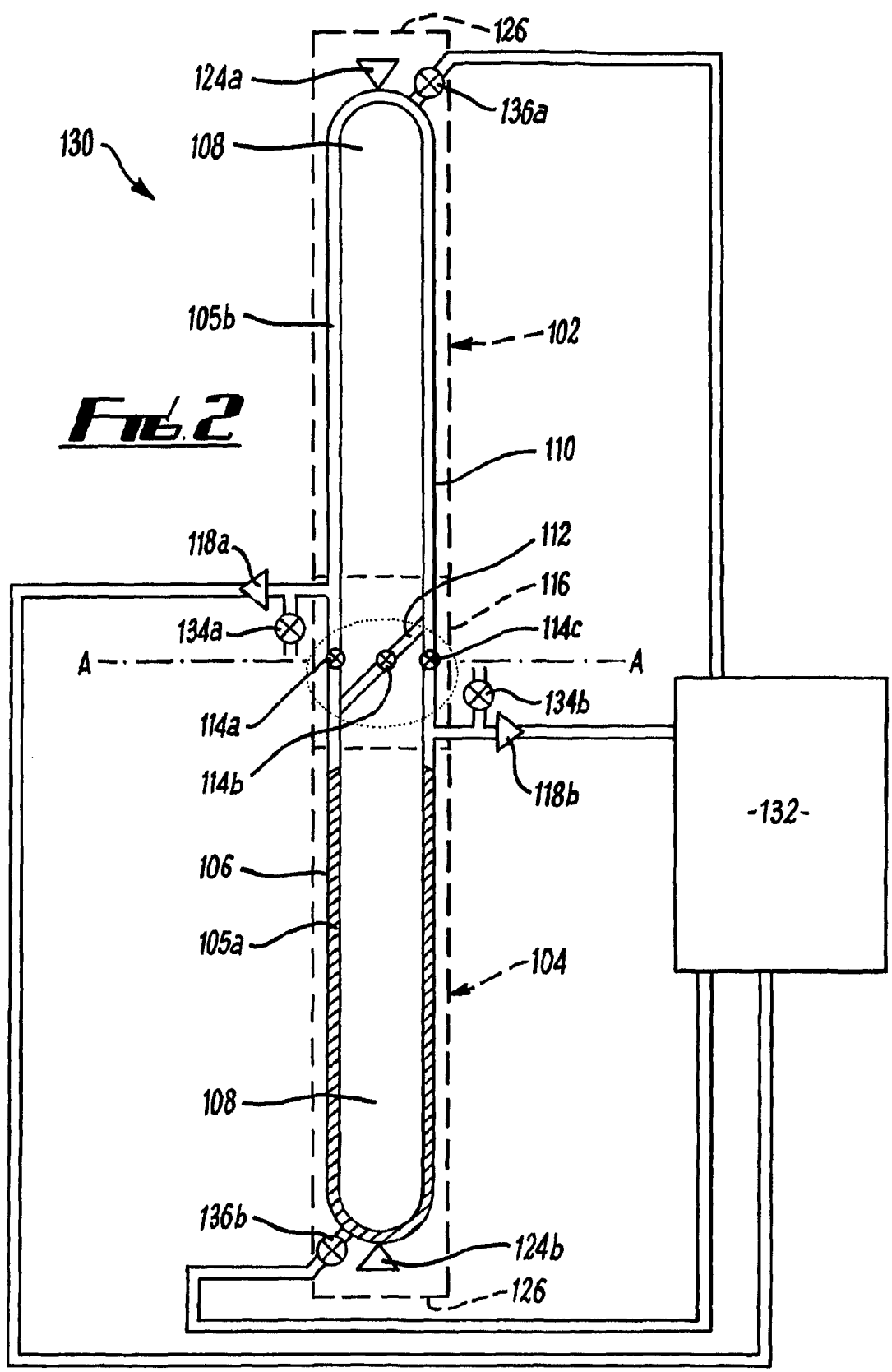

POWER CONVERSION

This is a national phase application of International Application PCT/GB2007/002477, filed Jul. 3, 2007, and claims priority to United Kingdom Patent Application No. 0613249.2, filed Jul. 4, 2006, United Kingdom Patent Application No. 0614005.7, filed Jul. 14, 2006 and United Kingdom Patent Application No. 0614322.6, filed Jul. 19, 2006.

FIELD OF THE INVENTION

Embodiments of the present invention relate to power conversion. In particular, they relate to a wind energy converter and/or a method for converting wind energy. Embodiments of the present invention also relate to a power generating system and/or a method for generating electrical power.

BACKGROUND OF THE INVENTION

The case for power generation using renewable energy sources such as wind, wave and tidal energy sources, is now abundantly clear. One of the difficulties associated with such renewable energy sources relates to intermittency, and the problem of intermittency is dealt with in the applicant's earlier international patent application no. PCT/GB2006/004577, relating to power generation.

There is also a problem with turbine size scaling. The torque required in the shaft of a Horizontal Axis Wind Turbine (HAWT) increases with the cube of blade diameter but power increases only with the square of blade diameter. Thus, as HAWT machines become larger the cost of power conversion equipment per unit of rated power generally increases.

BRIEF DESCRIPTION OF THE INVENTION

According to a first aspect of the present invention, there is provided a wind energy converter comprising a horizontal axis wind turbine including a plurality of blade members rotatable about a generally horizontal axis, some or all of the blade members having at least one mass member movable relative thereto under the action of radial forces induced by rotation of the blade members and under the action of gravitational force, wherein movement of the or each mass member relative to an associated blade member or associated blade members is arranged to provide for conversion of the wind energy.

Movement of the or each mass member relative to the blade member may be arranged to provide for conversion of the wind energy into a more readily transmissible form of energy, for example such as hydraulic, pneumatic, electrical, magnetic, or mechanical, for example by rotating a shaft at high speed.

The movement of the or each mass member under the action of radial force and thereafter under the action of gravitational force may be arranged to provide for conversion of the wind energy.

The arrangement of the or each mass member on an associated blade member may be such that centrifugal force associated with rotation of the blade members tends to move the or each mass member radially, between maximum radially inner and radially outer positions. The arrangement of the or each mass member on an associated blade member may be such that gravitational forces tend to move the or each mass member radially, between maximum radially inner and radially outer positions.

For example, the arrangement of the or each mass member may be such that the centrifugal force associated with rotation of the blade members tends to move the or each mass member radially outwardly towards the maximum radially outer position, and may be such that for at least a part of the cycle of rotation of the blade members, the action of gravitational forces tends to move the or each mass member radially inwardly towards the maximum radially inner position, for example towards the centre of rotation of the blade members.

In some embodiments, the movement of the or each mass member under the action of radial force may be arranged to move the or each mass member towards a tip of a blade member, and the movement of the mass member under the action of gravitational force may be arranged to move the mass member away from the tip of a blade member.

The wind energy converter may include means for applying a force to the or each mass member which may be arranged overcome the radial, and in particular centrifugal, force acting on the or each mass member and which may be arranged to thereby initiate movement of the or each mass member, for example away from a maximum radially outer position towards a radially inwardly direction, towards a maximum radially inner position.

The blade members may be hollow and may define a cavity which may be sealed at the tips of the blade members. The or each mass member may be movable relative to a blade member through the cavity. Possibly, a part of one cavity in a blade member is connected to a part of a cavity in another blade member such that some mass may move from the cavity within one blade into the cavity within another.

The movement of the or each mass member, for example through the cavity, may be arranged to compress gas. The compressed gas may be arranged to drive an expander, for example an air-turbine, which may be coupled to a generator, for example to thereby generate electrical power.

A plurality of mass members may be provided. A mass member may be associated with each blade member. Possibly, there may be more than one movable mass associated with each blade.

The or each mass member may be in the form of a solid member. The or each mass member may be in the form of liquid.

According to a second aspect of the present invention, there is provided a method for converting wind energy utilising a horizontal axis wind turbine including a plurality of blade members rotatable about a generally horizontal axis, the method comprising rotating the blade members about the generally horizontal axis and thereby moving one or more mass members relative to a blade member under the action of induced radial forces, and allowing the or each mass member to move relative to an associated blade member or associated blade members under the action of gravitational force, wherein movement of the or each mass member is arranged to provide for conversion of the wind energy.

Movement of the or each mass member relative to the blade member may provide for conversion of the wind energy into a more readily transmissible form of energy, for example such as hydraulic, pneumatic, electrical, magnetic, or mechanical, for example by rotating a shaft at high speed.

According to a third aspect of the present invention, there is provided a power generating system comprising:
  a drive arrangement;
  a compressor arranged to be driven by the drive arrangement and operable to compress gas;
  a heat recovery arrangement operable to cool the compressed gas, the heat recovery arrangement comprising a heat exchanger arrangement operable to cool compressed gas from the compressor and an expander operable to partially expand the cooled compressed gas from the heat exchanger;

a storage arrangement for storing cooled compressed gas from the heat recovery arrangement; and an expander arrangement operable to expand compressed gas from the storage arrangement and/or from the expander to thereby drive a generator to generate electrical power.

The expander may also be operable to drive the generator to generate electrical power.

The heat recovery arrangement may be operable to cool the compressed gas to a temperature which may be substantially equal to the temperature externally of the storage arrangement such that the heat losses from the compressed gas are minimised.

The storage arrangement may be an underwater storage arrangement and the heat recovery arrangement may be operable to cool the compressed gas to a temperature which may be substantially equal to the temperature of the water surrounding the underwater storage arrangement.

The underwater storage arrangement may comprise a deformable storage tank which may define a variable storage volume for storing cooled compressed gas from the heat recovery arrangement.

The compressor may be operable to compress gas adiabatically or substantially adiabatically.

The heat exchanger arrangement may comprise a plurality of heat exchangers which may be operable to recover heat from the compressed gas to thereby cool the compressed gas.

The power generating system may be operable to heat the compressed gas from the underwater storage arrangement and/or from the expander prior to expansion in the expander arrangement.

The system may be operable to utilise heat recovered by the heat recovery arrangement to heat the compressed gas.

The expander arrangement may comprise a plurality of expansion stages, and the system may be operable to heat the compressed gas after each expansion stage.

The system may be operable to utilize heat recovered by the heat recovery arrangement to heat the compressed gas after each expansion stage.

According to a fourth aspect of the present invention, there is provided a method for generating electrical power, the method comprising:

compressing gas;

cooling the compressed gas by passing the compressed gas through a heat exchanger arrangement and thereafter by partially expanding the cooled compressed gas in an expander;

storing the cooled compressed gas in a storage arrangement; and expanding the compressed gas from the storage arrangement and/or the expander, wherein the expansion of the compressed gas drives a generator to generate electrical power.

The method may comprise cooling the compressed gas to a temperature substantially equal to the temperature externally of the storage arrangement.

The storage arrangement may be an underwater storage arrangement and the method may comprise cooling the compressed gas to a temperature substantially equal to the temperature of the water surrounding the underwater storage arrangement ensuring heat losses from the compressed gas are minimised.

The method may comprise heating the compressed gas from the storage arrangement prior to expansion thereof.

The method may comprise further expanding the partially expanded gas from the expander to drive the generator to generate electrical power. The method may comprise heating the partially expanded gas prior to said further expansion.

The step of expanding the compressed gas may comprise expanding the compressed gas in multiple expansion stages. The method may comprise heating the gas after each expansion stage.

The method may comprise adiabatically compressing the gas.

BRIEF DESCRIPTION OF THE DRAWINGS

Embodiments of the present invention will now be described by way of example only and with reference to the accompanying drawings, in which:—

FIG. 2 is a part diagrammatic illustration of another embodiment of a wind energy converter;

DETAILED DESCRIPTION OF EMBODIMENTS OF THE INVENTION

Figure 1:
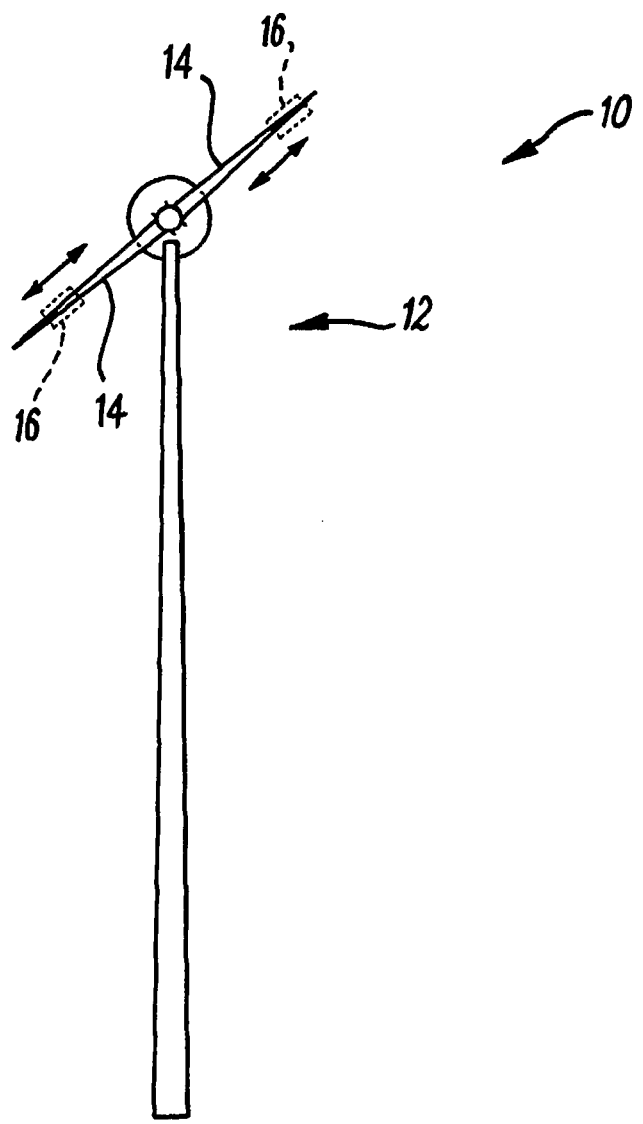
FIG. 1 is a diagrammatic illustration of a wind energy converter.

Referring initially to FIG. 1, there is shown generally a wind energy converter 10 comprising a horizontal axis wind turbine 12 including a plurality of blade members 14 rotatable about a generally horizontal axis. At least one, and possibly each, of the blade members 14 has at least one associated mass member 16 which is movable therealong under the action of radial forces induced by rotation of the blade members 14 and under the action of gravitational force. The movement of the or each mass member 16 relative to the blade members 14 is arranged to provide for conversion of the wind energy, for example into a form of energy which is more readily transmissible, such as hydraulic, pneumatic, electrical, magnetic, or mechanical, for example by rotating a shaft at high speed.

Figure 1A:
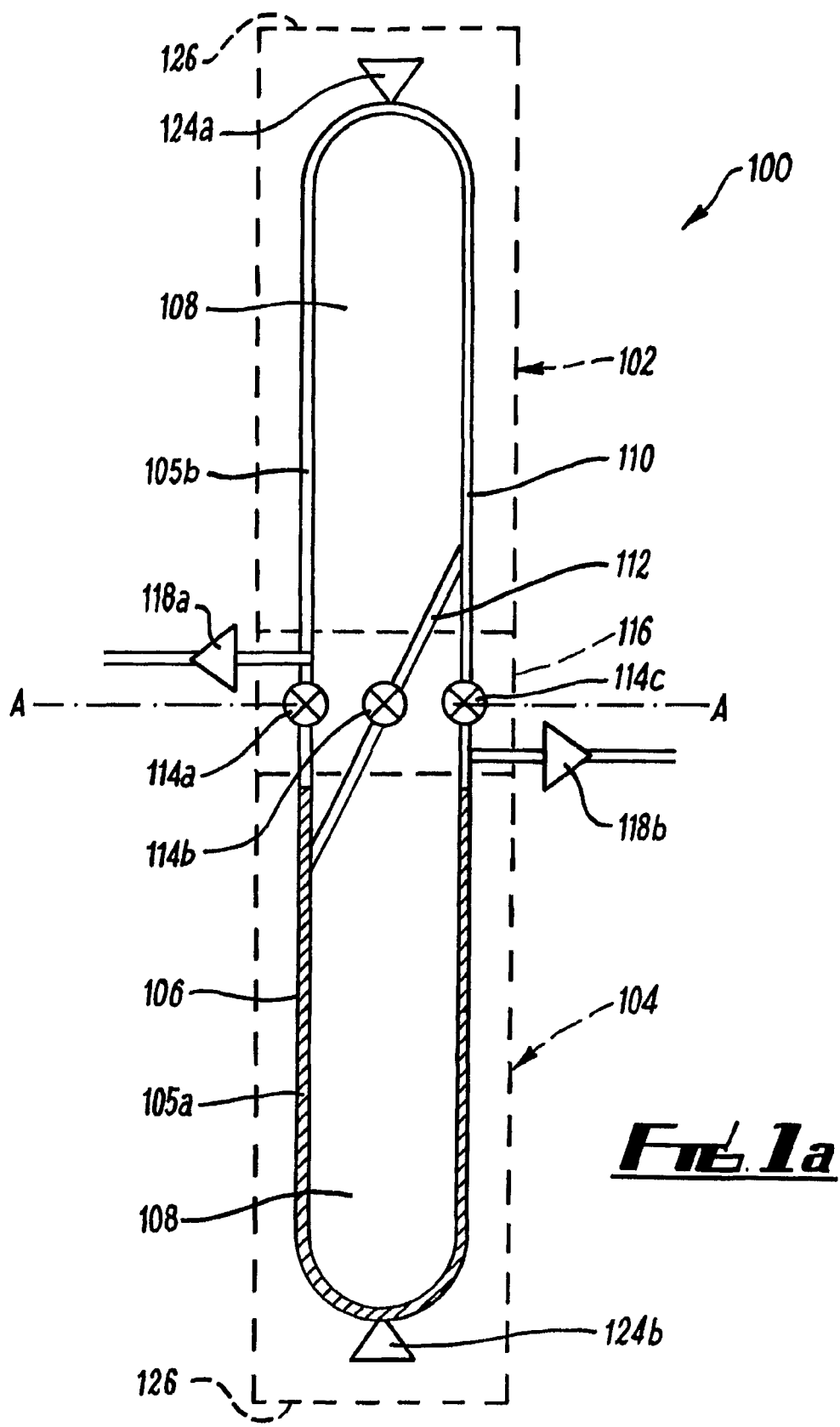
FIG. 1a is a part diagrammatic illustration of one embodiment of a wind energy converter.

In more detail and referring to FIG. 1a, there is shown part of a first embodiment of a wind energy converter 100. The wind energy converter 100 comprises a horizontal axis wind turbine including diametrically opposite blade members 102, 104 (illustrated by broken lines) mounted on a hub 116 and rotatable about a generally horizontal axis A-A (in a direction into the page). In the position shown in FIG. 1, the blade member 102 is in an upper position and therefore considered to be an upper blade member whilst the blade member 104 is in a lower position and therefore considered to be a lower blade member.

The pair of blade members 102, 104 have a mass member 106 associated therewith and movable therealong, and in this embodiment, the movable mass member 106 is in the form of a fluid 105a located within a cavity 108 defined by each blade member 102, 104. The cavities 108 and in particular tubing 110 in each blade 126 may be connected or in communication. Specifically, the movable mass member 106 comprises water 105a running within tubing 110 inside the cavity 108 defined by each blade member 102, 104. A heavier or lighter density liquid or the density of the water may be adjusted by additives dependent upon requirements. However, water is relatively freely available, heavy and acceptable for use in accordance with aspects of the present invention.

The cavity 108 of the diametrically opposite pair of blade members 102, 104 contains a complete circuit of tubing 110 having an interconnecting tube 112. Three controlled bi-directional valves 114a-c are present within the hub 116 of the wind turbine. Two outward oriented non-return valves 118a, 118b allow compressed gas to be delivered to a desired destination, which may be a high-pressure manifold or a compressed gas reservoir (not shown). It is envisaged that there is always a high pressure present on one side of the non-return valves 118a, 118b.

Two inwardly oriented non-return valves 124a, 124b are provided at the blade tips 126 to enable the intake of gas, for example from a low-pressure manifold or reservoir, as one half of the tubing 110 is evacuated, and as the pressure of gas in the evacuated tubing 110 falls below atmospheric pressure. The low pressure reservoir may be the atmosphere, in which case the gas may be air at atmospheric pressure. The gas does not however need to be air and does not need to be at atmospheric pressure for embodiments of the invention to work effectively. Furthermore, it may be possible to replace the use of air with a lower density fluid which is immiscible with the "driving" liquid.

In operation, the bottom half of the water circuit, inside the lower blade member 104, is completely filled with water 105a and the top half, inside the upper blade member 102, is devoid of water and filled with gas 105b, as is illustrated in FIG. 1a. The turbine turns over, under the action of rotation caused by wind incident on the blade members 102, 104, with the three bi-directional valves 114a-c all closed such that the bottom half then takes up the position of the top half and vice-versa. In this position, the blade member 104 is now the upper blade member and the top half of the water circuit, inside the upper blade member 104, is completely filled with water 105a; the blade member 102 is now the lower blade member and the bottom half of the water circuit, inside the lower blade member 102, remains devoid of water is filled with gas 105b (possibly at slightly less than atmospheric pressure).

The central bi-directional valve 114b is opened first and one half of all the water 105a in the upper blade member 104 falls into the lower blade member 102. Gas begins to be sucked into the top half of the water circuit in the upper blade member 104 through the valve 124b. Then, before any gas passes through the interconnecting tube 112, the left-most bi-directional valve 114c is opened and the central bi-directional valve 114b is closed. The remaining water 105a in the upper blade member 104 begins to fall into the lower blade member 102. In all of the time that water is falling, the pressure in the right hand branch of the lower blade member 102 is rising. When that gas pressure rises above the pressure on the outside of the non return valve 118a, compressed gas is delivered to the desired destination.

Where the compressed gas is delivered to a compressed gas reservoir, depending on the pressure of the compressed gas reservoir, the bi-directional valve 114a may remain closed for the entire period, in which case a relatively large volume of relatively-low pressure gas may be delivered. Alternatively, after the instant where the pressure beneath that valve 114a has risen above value of the pressure immediately above it, some gas may be allowed to escape upwards through this valve 114a. This has the effect of allowing the downward travelling water to accumulate a higher momentum and a smaller volume of higher pressure compressed gas can be generated as a result.

At certain rotational speeds of the wind turbine (well within its normal operating duty), the centrifugal (radial) forces acting on the movable mass members 106 would be such that the mass members 106 would not fall naturally under gravity. Instead, the mass members 106 would prefer to stay lodged at the outermost radius of their associated blade member, towards the blade tips 126. It is clear to see that if some energy is used to move the mass members 106 radially inward against the centrifugal forces, this energy is recoverable when the same mass members 106 accelerate back radially outwardly towards the tips 126. Furthermore, it may be possible to shape the mass members 106 to inhibit and/or stimulate movement under the influence of radial forces. Such shaping may change with the strength of the radial forces. For example, a constriction jacket could be placed towards the valve 124 end with the jacket filled with a liquid forced outwardly by radial forces to squeeze part of the moveable mass members 106 to stimulate movement. Additionally, it will be appreciated that the water may have additives to improve its fluidity and viscosity whilst inner surfaces may be coated to reduce surface adhesion with the water. The water will normally include de-icing agents etc to maintain operability over a wider temperature range.

As indicated above cavities from different blades may be connected but also there may be several moveable members in each cavity. Furthermore, the moveable members in different blades may be connected for operational performance and possibly reciprocal action. Thus, it may be possible to provide diametrically opposite blades with respective solid pistons which are coupled with a tie-bar paving through a hub to generate compressed air when the blades rotate. This may provide a relatively simple mechanical structure where only a "2 g" centripetal acceleration at the tips will lead to gravitational fall of the pistons.

FIG. 2 illustrates part of an alternative wind energy converter 130 which addresses this difficulty. The wind energy converter 130 is similar to the wind energy converter 100 illustrated in FIG. 1a, and corresponding features are therefore designated using corresponding reference numerals.

The wind energy converter 130 includes means for applying a force to the mass members 106 to overcome the radial forces and thereby initiate movement of the mass members away from the tips 126 of their associated blade members.

In more detail, the non-return valves 118a, 118b are arranged to deliver compressed gas to a compressed gas reservoir 132. A controllable valve 134a, 134b associated with each U-shaped tube provides the capability to allow some gas at atmospheric pressure to be released again from the U-shaped tube in order that the energy available in the falling body of water will be sufficient to carry all of the water into the bottom U-shaped tube and to provide for the maximum amount of compressed gas to be delivered to the compressed gas reservoir 132.

In accordance with this embodiment, the means for applying a force include controllable inlet valves 136a, 136b which are present at the extremes of each U-shaped tube, generally in the region of the blade tips 126, and these are connected to respective ducts 138a, 138b which allow compressed gas to be fed from the compressed gas reservoir 132 into the back into the U-shaped tube to initiate movement of the mass member 106, and specifically to assist in propelling the water 105a downwards when the blade members 102, 104 illustrated in FIG. 2 are inverted, following rotation of the blade members 102, 104 about the horizontal axis A-A. At the moment when the fall of water 105a is to be initiated from the upper blade member 104 into the lower blade member 102, the controllable inlet valve 136b on the upper blade member 104 is opened. In a very short time interval, the pressure at the top of the U-shaped tube reaches the same pressure as the stored compressed gas and (by simple hydrostatics) the pressure elsewhere in the tube can be computed directly.

The operation of the bi-directional valves 114a-c and the outward non-return valve 118a is controlled in the same manner that has already been set out above with respect to the wind energy converter 100 illustrated in FIG. 1a. The controllable inlet valve 136b of the upper blade member 104 must be kept open sufficiently long to ensure that pressure in the entire continuum of water remains positive, but it will usually have been closed again well before one-half of the water 105a has fallen into the bottom half of the tubing 110 in the lower blade member 102. Note that both sides of the upper U-shaped tube would be vacated at similar rates. Before the water in the lower U-shaped tube in the lower blade member 102 has begun to fill the rising side of the tubing 110, the instantaneous pressures in the water column could be very low at particular locations and for this reason, the timing of the closure of the controllable inlet valve 136b is important. As soon as the water has turned the bend in the lower U-shaped tube in the lower blade member 102, there is a source of some back-pressure and the danger of cavitation within the column is passed.

The controllable valve 134a in the bottom U-shaped tube in the lower blade member 102 is opened at the same instant that the water begins to fall into the lower blade member 102 from the upper blade member 104. If it were not, then before the water had fully-transferred from the upper blade member 104 to the lower blade member 102, its flow-rate would have reduced to zero and a bounce-back would be inclined to occur. The bounce-back could be prevented by closing the controllable valves 114a-c but the objective of having a complete transfer of water between the upper and lower blade members 104, 102 would not have been met. The controllable valve 134b is closed again at a point where the combined potential and kinetic energy of the water body will be sufficient to compress all of the gas remaining in the U-shaped tube to the pressure of the compressed gas reservoir 132.

Figure 3:
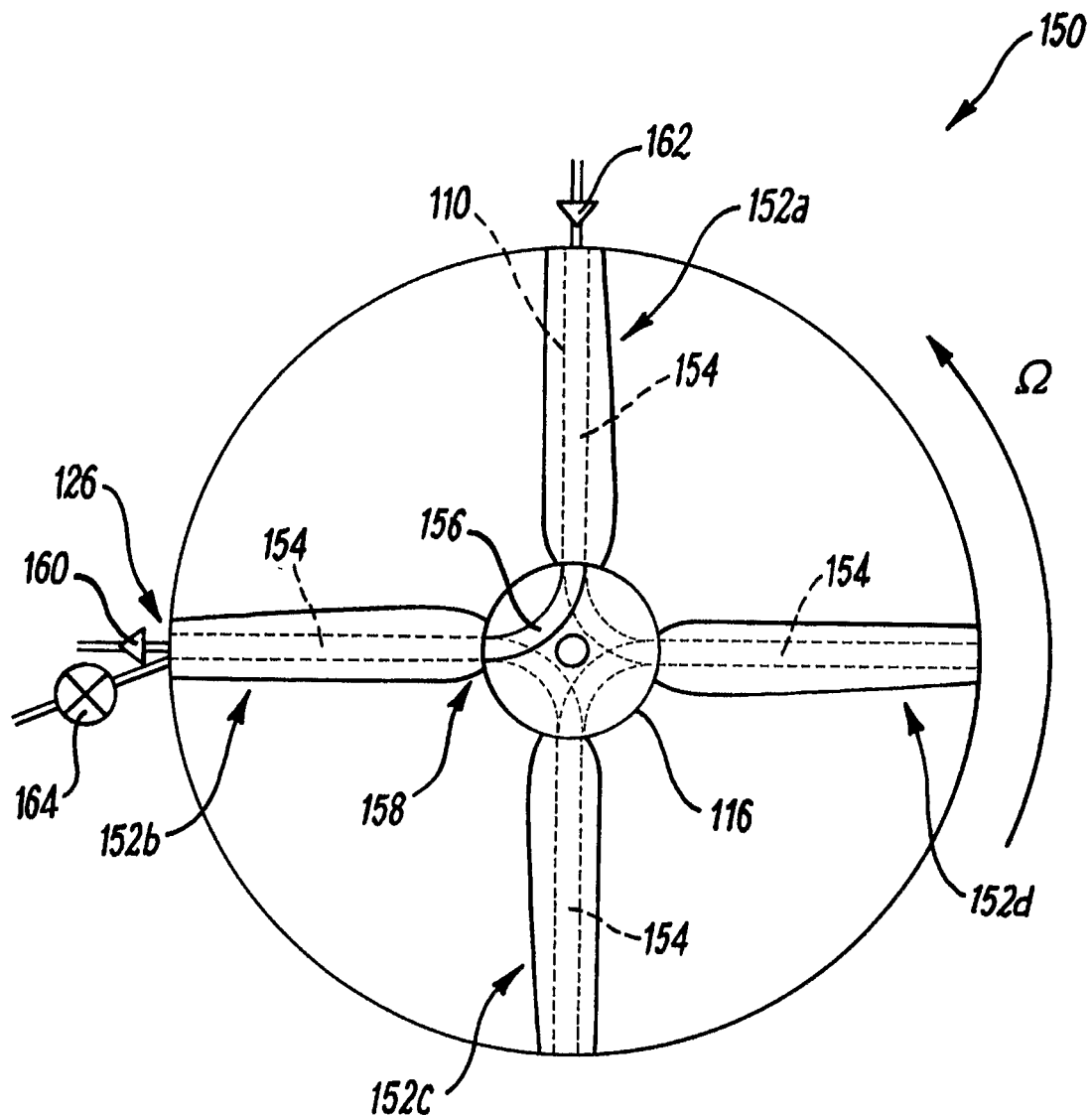
FIG. 3 is a part diagrammatic illustration of a further embodiment of a wind energy converter.

FIG. 3 illustrates an alternative wind energy converter 150. The wind energy converter 150 shares some similarities with the wind energy converter 100 of FIG. 1a, and corresponding features are therefore designated with corresponding reference numerals.

In the wind energy converter 150, the movable mass member 106 is again composed of water running within tubing 110 inside blade members 152a-d. This embodiment is simpler than the embodiments illustrated in FIGS. 1a and 2, and is suitable for turbines having four or more blades.

Each blade member 152a-d may have a single tubular volume 154 within it. When one blade member 152a is approaching top dead centre, it is full of water and a passage 156 is opened through the hub 116 between the blade member 152a and another blade member 152b whose tubular volume 154 is still above the turbine centre. Because of its orientation, the tubular volume 154 within this lower blade member 152b fills from the root 158 and compressed gas is generated towards the tip 126 thereof. As in the previous embodiments, the compressed gas is conveyed out through an outward facing non-return valve 160 present on each blade member 152a-d (only one non-return valve 160 is illustrated) and an inward facing non-return valve 162 also present at the tip 126 of each blade member 152a-d (only one non-return valve 162 is illustrated) provides for the induction of gas.

FIG. 3 omits details of how the compressed gas is conveyed back down through the blade members 152a-d to the hub 116 and then into a compressed gas reservoir. These details are obvious to a person skilled in the art. FIG. 3 also shows a controllable valve 164 which can allow some of the charge of gas in the blade member 152b to escape again without energy loss so that momentum effects could build up higher compressions.

In the wind energy converters 100, 130 and 150 of FIGS. 1 to 3, alternative arrangements can be envisaged in which the movement of fluid 105a within the blade members is not used to compress gas, but is instead used to directly drive a turbine. Such a turbine could, for example, be located in the hub of the wind turbine, fluid flow through the hub being arranged to drive the turbine.

As indicated above the wind energy converters 100, 130 and 150 as depicted in FIGS. 1 to 3 relate to utilisation of a moveable mass member 106. This moveable mass member is conveniently a liquid such as water. It may be possible as an alternatively to provide a solid mass weight which slides along the blades. The solid mass member may be associated with a piston within a cylinder such that a gas or liquid is compressed by the radial (centrifugal) forces outwardly presented on the blade in one direction and through gravitation force in the opposite direction. As with the embodiments described above with regard to FIGS. 1 to 3 the compressed air or gas can then be utilised appropriately. The solid moveable mass may be variable in mass depend upon operation requirements such as rotational speeds for the blades. In such circumstances the solid mass may be hollow and electively filled with a fluid such as water or emptied in order to change its mass dependent upon requirements.

With regard to utilising a value such as 136 in order to stimulate movement of the moveable mass as described with regard to FIG. 2 it will be understood that the extent to which this value 136 is opened may be varied dependent upon operational requirements. In such circumstances a sensor may be provided within a tube 110 defining the mass 106. This sensor may determine the extent and rate of movement of the water 105 and so appropriately regulate the valve 136. Furthermore, the sensors may be utilised to determine the most appropriate trigger point for operation of the valves 136 over operational cycles, that is to say rotation of the blades 126 through historical, that is to say immediately proceeding results or commissioning test results, in order to more efficiently operate and stimulate movement of the water 105 as required for operational efficiency.

Figure 4:
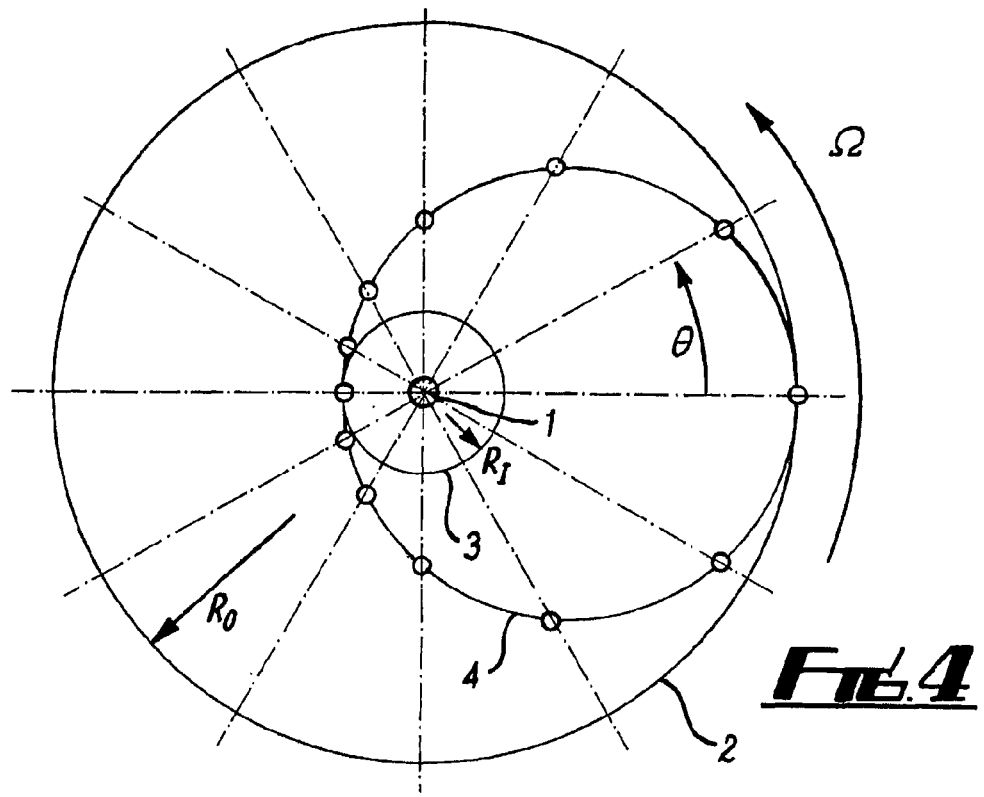
FIGS. 4 and 5 provide diagrammatic illustrations of the energy conversion concept utilised by the wind energy converters of FIGS. 1 to 3.

Referring to FIG. 4, the core concept of the embodiments described with reference to FIGS. 1 to 3 relates to the movement of mass members along the axes of the blade members. In FIG. 4, the centre of rotation of the turbine 1 coincides with the intersection of the two centre-lines. When being driven by the wind, the direction of rotation of this turbine is shown as being anti-clockwise. Clearly, the embodiments of the invention can work equally well for a clockwise rotation, subject to the obvious changes.

A circle 2 signifies the trajectory of a point on the turbine blade members close to the tips. Another circle 3 signifies the trajectory of a point on the turbine blade members close to the roots. A third closed-curve 4 signifies the trajectory of the centre of mass of the movable mass member on any single blade member (including the hub). This particular trajectory will be referred to as the "centre of mass trajectory" or COMT. FIG. 4 shows the COMT as a circle, but in some embodiments, different COMTs would be achieved. Clearly, the COMT can never get quite as far as the blade tips as long as the movable mass member is contained within the blade members. It can potentially get to a lower radius than the blade roots if the mass is allowed to pass into the hub. This fact is explored later.

The principles of the invention are now explained in a general form. Let $\theta$ represent the angle of any one blade member. At $\theta=0$, the blade member lies along the positive x-axis (horizontal) and as $\theta$ increases, the blade member lifts towards the positive y-axis. Let $R_{COMT}(\theta)$ represent the radial position of the centre of mass of the movable mass member associated with that blade member and let M denote that mass member itself. At a single instant, the downward force exerted on the movable mass member is Mg where g is the acceleration due to gravity. Assume in the first instance that the turbine is turning sufficiently slowly that acceleration effects may be ignored and assume also that there are no losses associated with movement of the mass member. Then, at one instant, the gravitational force on the mass member is reacted by force from the blade member acting on the mass member in the opposite direction to gravity. Over one complete cycle, the net work done on the mass member is zero since the mass member returns to where it was (and since gravity is a potential field). However, during the cycle some net work has been done on the mass member by the circumferential forces and the mass member itself has done exactly this same amount of work on the radial forces in the blade members.

Work done by the circumferential forces =
$$\int_0^{2\pi}(Mg\cdot\cos(\theta))(R_{COMT}(\theta)\cdot d\theta)$$

Work done by the radial forces = $\int_0^{2\pi}(Mg\cdot\sin(\theta))\left(\frac{dR_{COMT}(\theta)}{d\theta}\cdot d\theta\right)$ These two can easily be shown to be exact negatives of each other in general using integration-by-parts.

Figure 5:
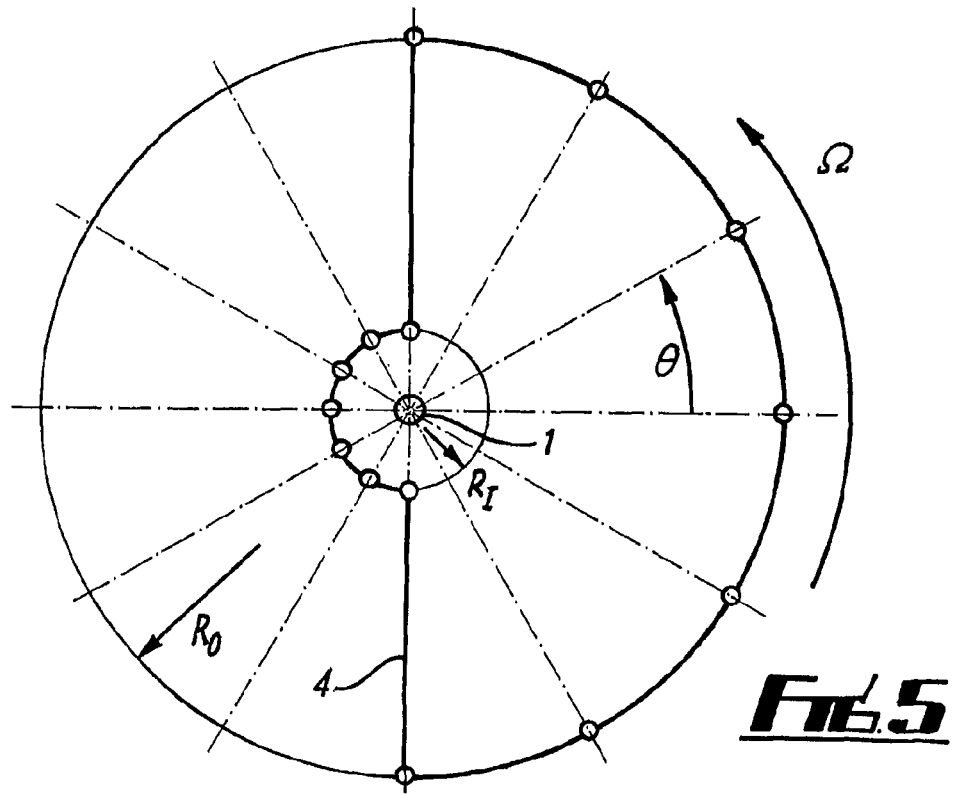

Moreover, the maximum work done by the circumferential forces is achieved by having a COMT in the shape of an exact semi-circle, as FIG. 5 illustrates. In this case, the work done by the circumferential forces is 2 Mg($R_O-R_I$) where $R_O$ and $R_I$ are the radii of the turbine tips and the same amount is extracted by the radial forces.

In the practical embodiments described above with reference to FIGS. 1 to 3, we will not recover 2 Mg($R_O-R_I$) on each blade member in each cycle as work into the radial forces. In general, we will recover xMgD where D (>$2R_O$) is the tip diameter of the turbine and where x is a number less than 1 which reflects the combined facts that D>$2(R_O-R_I)$ and that the shape of the COMT will not be the "optimal" shape described by FIG. 5. The dimensionless number, x, can be described as the extraction coefficient. With a high value for x, the movable mass member per blade member can be smaller. The downside to a lower value of x will be that the movable mass member must be larger.

Acceleration forces were ignored in the simple explanation above. These forces are not necessarily insignificant compared with the gravitational forces but it will be seen in the embodiments that their net effects are zero. Taking the simple COMT of FIG. 5 as an example, it would be possible that the angular speed of the turbine could be sufficiently large that the mass would not fall from the highest point simply under the pull of gravity. However, whatever work was put in to the mass by the radial forces to overcome centrifugal forces and start its fall would be recovered in full at the end of its fall. This situation has been dealt with in the wind energy converter 130 described with reference to FIG. 2, Referring now to FIG. 6 there is shown generally a power generating system 200 for generating electrical power. The power generating system 200 is typically located off-shore.

The power generating system 200 comprises a drive arrangement 202, and in the illustrated embodiment this is in the form of a wind turbine 204. It should however be appreciated that the drive arrangement 202 could be a turbine driven by wave or tidal power. The power generating system 200 also comprises a generator 206 which generates electrical power in a conventional manner from mechanical motion—either rotation or reciprocating motion. Suitable power transmission cables (not shown) are provided to transmit the generated electrical power to a desired location, typically on-shore.

The power generating system 200 includes a compressor 208 which is arranged to be driven directly by the drive arrangement 202 to compress gas, and in particular air, adiabatically or at least substantially adiabatically.

The power generating system 200 further includes an expander arrangement 210 comprising a plurality of expanders 212a-c which provide a plurality of expansion stages. Each of the expanders 212a-c of the expander arrangement 210 is mechanically coupled to the generator 206 so that expansion of compressed gas by the expanders 212a-c drives the generator 206 to generate electrical power.

The power generating system includes a storage arrangement 214 for storing compressed gas, and in embodiments of the invention the storage arrangement 214 is an underwater storage arrangement in the form of a deformable storage tank. Details of such a deformable underwater storage tank are set out in the applicant's earlier international patent application no. PCT/GB2006/004577. As set out in this earlier application, the provision of the storage arrangement 214 enables electricity to be generated when there is little or no wind, since compressed air from the storage arrangement 214 can be expanded by the expander arrangement 210, thereby driving the generator 206.

The power generating system 200 also includes a heat recovery arrangement 216 which is operable to recover heat from the compressed gas provided by the compressor 208 to cool the compressed gas prior to storage in the storage arrangement 214, and the heat recovery arrangement 216 includes a heat exchanger arrangement 218 comprising a plurality of heat exchangers 220a-c and a primary expander 222.

Recovery of heat from the compressed gas prior to storage in the storage arrangement 214, and in particular useful recovery of that heat, is highly advantageous since in the event that the compressed gas was not cooled and the temperature externally of the storage arrangement 214 was significantly lower than the temperature of the stored compressed gas, there would be significant heat losses from the compressed gas due to conduction, resulting in irreversible energy losses. Indeed, where the storage arrangement 214 is an underwater storage arrangement 214, the temperature of the heated compressed gas provided by the compressor 208 will be substantially higher than the temperature of the sea water surrounding the underwater storage arrangement 214.

In order to minimise heat losses from the stored compressed gas to the surrounding sea water, it is desirable to cool the compressed gas to a storage temperature $T_S$ which is substantially equal to, or typically a few degrees higher than, the temperature of the sea water. In embodiments of the invention, the storage temperature $T_S$ is typically in the region of 8° C. The pressure at which the compressed gas is stored in the storage arrangement 214 is hereinafter referred to as the storage pressure $P_S$.

In use, during times when there is sufficient wind to rotate the wind turbine 204, the wind turbine 204 drives the compressor 208 which thereby compresses air adiabatically from ambient temperature $T_{amb}$ and ambient pressure $P_{amb}$ to provide a primary stream of heated compressed air at temperature $T_H$ and pressure $P_H$. This primary stream of heated compressed air provided by the compressor 208 is delivered through insulated pressure-pipes to the heat recovery arrangement 216, and initially to the one or more heat exchangers 220a-c.

Heat is extracted from the heated compressed air by the heat exchangers 220a-c, and this reduces the temperature of the compressed air from the initial temperature $T_H$ to an intermediate temperature $T_M$. There is little or no substantial pressure drop through the heat exchangers 220a-c, and thus the pressure of the compressed air $P_M$ after cooling by the heat exchangers 220a-c is the same or substantially the same as the pressure $P_H$ of the primary stream of heated compressed air provided by the compressor 208. It will be appreciated that flow through the heat exchangers 220a-c is driven by the compressor 208 to maintain pressure to compensate for potential volumetric losses due to Boyle's Law.

After the compressed air is cooled by the heat exchangers 220a-c, it is partially expanded in the primary expander 222, and this partial expansion further cools the compressed air, and in particular reduces the temperature and pressure of the compressed air from the intermediate temperature $T_M$ and the intermediate pressure $P_M$ to the storage temperature $T_S$ and the storage pressure $P_S$. The primary expander 222 is coupled to the generator 206, and accordingly the partial expansion of the compressed air in the primary expander 222 drives the generator 206 to thereby generate electrical power.

During high winds, the compressor 208 may be driven by the wind turbine 204 at a sufficient speed that there is enough compressed air to be fed from the heat recovery arrangement 216, at storage temperature $T_S$ and at storage pressure $P_S$, to both the expander arrangement 210 and the underwater storage arrangement 214. During moderate winds, the compressor 208 may be driven by the wind turbine 204 at a sufficient speed that there is enough compressed air to be fed from the heat recovery arrangement 216, at storage temperature $T_S$ and at storage pressure $P_S$, to drive only the expander arrangement 210. However, when the wind is moderate there will be no storage of additional compressed gas and no heat will be removed from the high pressure gas stream. During times when there is insufficient wind to drive the wind turbine 204 and hence the compressor 208 so that compressed air can be fed directly to the expander arrangement 210, air can be delivered to the expander arrangement 210 from the storage arrangement 214 at storage temperature $T_S$ and at storage pressure $P_S$. In all of the aforementioned scenarios, it will be readily appreciated that the expander arrangement 210, and hence the generator 206, can be driven such that the power generating system 200 is able to generate electrical power, and the problem of 'intermittency' is thereby significantly reduced.

In the above circumstances it will be appreciated there are effectively two expander arrangements. A first expander arrangement utilised before storage of compressed air within the storage arrangement 214 and a second expander arrangement utilised after storage. The first and second expander arrangements use substantially the same elements but the expander 222 is generally added to the first pre-storage expander arrangement.

In order to optimise the operational efficiency of the power generating system 200, it is desirable to heat the compressed air delivered to the expander arrangement 210, whether this is delivered directly from the heat recovery arrangement 216, and in particular from the primary expander 222, in times of high or moderate winds, or whether this is delivered indirectly from the storage arrangement 214 in times when there is little or no wind.

In embodiments of the invention, the heat recovered by the heat recovery arrangement 216, and in particular the heat exchangers 220a-c, can be used to reheat the compressed air prior to delivery to the expander arrangement 210. In embodiments of the invention, the heat exchangers 220a-c may each include a burner 224a-c, for example a gas fired burner, which may be operable to reheat the compressed air prior to delivery to the expander arrangement 210.

Even during times of high or moderate winds when substantial amounts of compressed air are being fed from the heat recovery arrangement 216 to the underwater storage arrangement 214, it is appropriate to feed some compressed air directly from the heat recovery arrangement 216 to the expander arrangement 210 for expansion thereby since this enables the heat recovered by the heat recovery arrangement 216 to be reused to reheat the compressed air prior to delivery to the expander arrangement 210, as discussed in the preceding paragraph, rather than simply dumped and hence wasted. This increases the operational efficiency of the power generating system 200.

In the illustrated embodiment, multiple stages of reheat are provided by the heat exchangers 220a-c, prior to each of the expansion stages provided by the plurality of expanders 212a-c. In particular, compressed air at storage temperature $T_S$ and storage pressure $P_S$ is fed from the primary expander 222 or the storage arrangement 214 to a first heat exchanger 220a where its temperature is raised, and the heated compressed air is then expanded in a first expander 212a, typically a high pressure turbine, causing a reduction in the pressure and temperature of the compressed air. The air exhausted from the first expander 220a is then fed to a second heat exchanger 220b where it is reheated before being expanded in a second expander 212b, typically an intermediate pressure turbine, causing a further reduction in the pressure and temperature of the compressed air. The air exhausted from the second expander 220b is then fed to a third heat exchanger 220c where it is reheated before being expanded in a third expander 212c, typically a low pressure turbine, causing a further reduction in the pressure and temperature of the compressed air. Finally, air exhausted from the third expander 212c is discharged to atmosphere.

Figure 7:
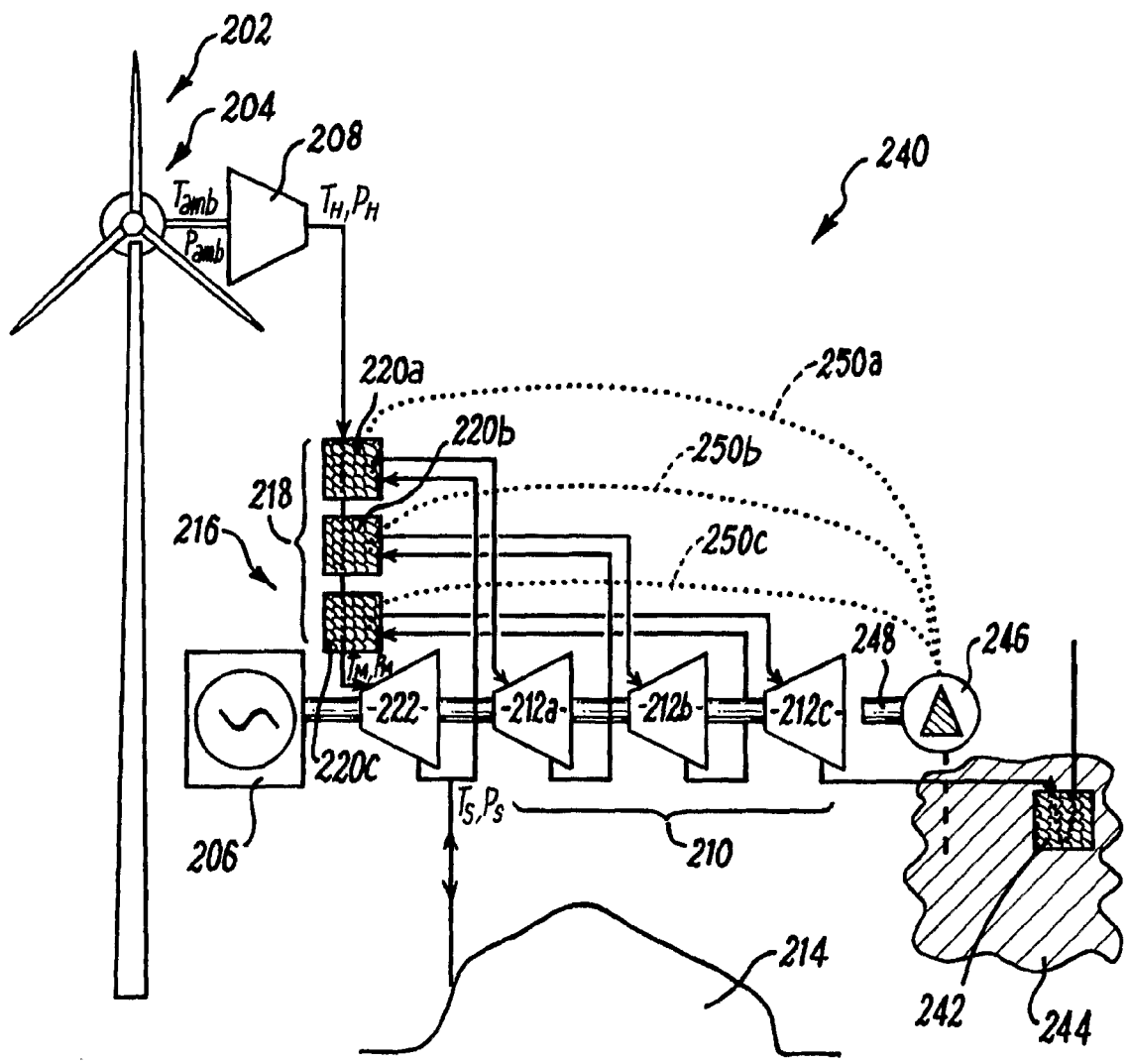
FIG. 7 is a diagrammatic illustration of another embodiment of a power generating system.

FIG. 7 illustrates a modified power generating system 240, which is similar to the power generating system 200 and in which corresponding features are designated with corresponding reference numerals.

The power generating system 240 includes a further heat exchanger 242 and air exhausted from the third expander 212c, which is typically at a temperature above ambient temperature, is fed to the further heat exchanger 242 instead of being discharged to atmosphere. Heat extracted from the exhausted air by the further heat exchanger 242 is used to raise the temperature of a heat reservoir 244, for example a body of sea water which may isolated from the surrounding sea water by a thermal barrier and which may be covered with a flexible insulating top, possibly adapted to maximise solar heat gain in the heat reservoir 244.

The power generating system 240 also includes a heat pump 246 which is driven by the expander arrangement 210 via a shaft 248, and the heat pump 246 is operable to pump heated fluid in one or more closed fluid circuits 250a-c between the heat reservoir 244 and the heat exchangers 220a-c. Pumping of the fluid by the heat pump 246 thereby transfers heat from the heat reservoir 244 to the heat exchangers 220a-c, and this heat can be used to reheat the compressed air prior to expansion in the expanders 212a-c.

As a further addition, energy losses occurring in the generator 206 may be drawn off as heat into the fluid within the closed circuits 250a-c, to further improve heating of the compressed air in the heat exchangers 220a-c.

Figure 6:
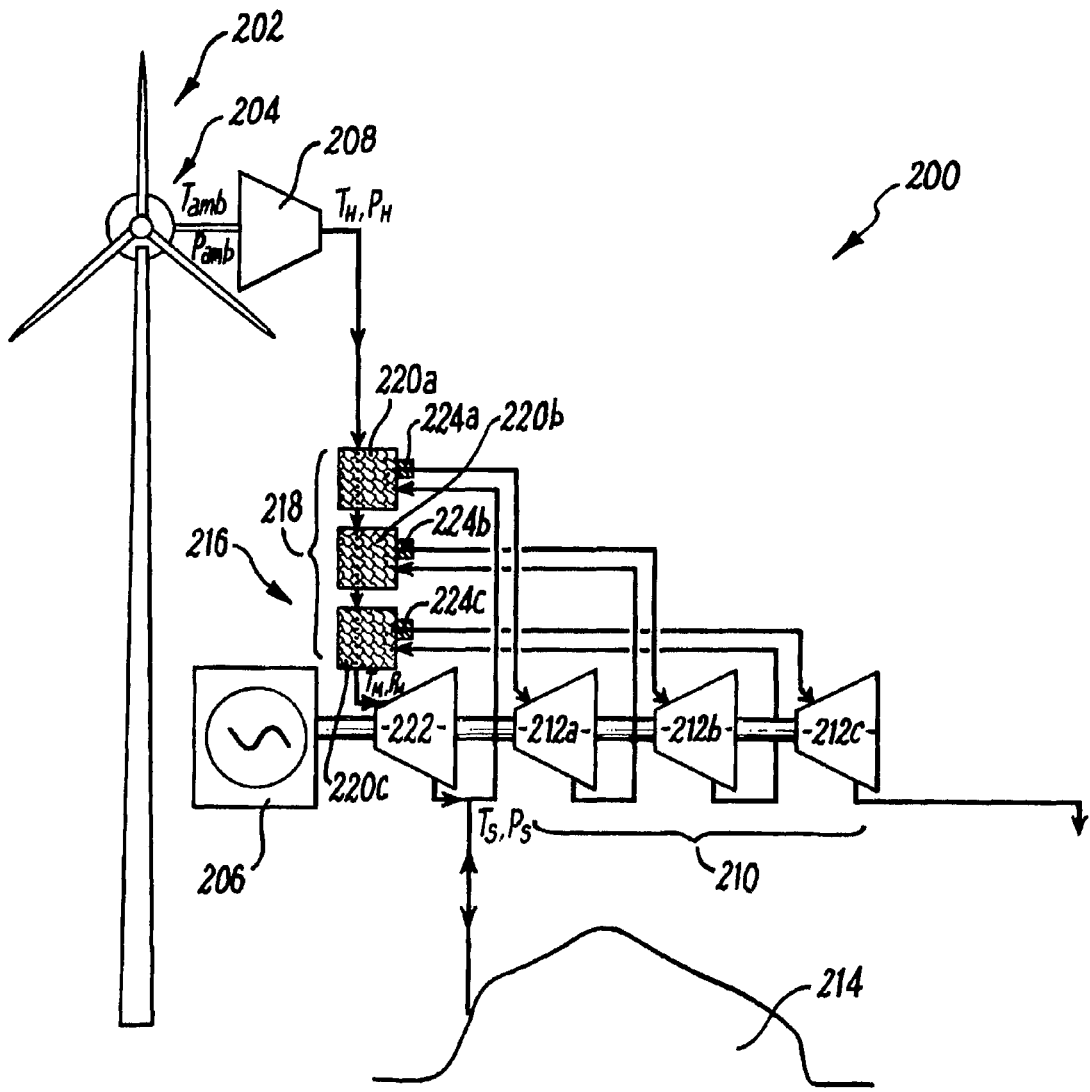
FIG. 6 is a diagrammatic illustration of one embodiment of a power generating system.

It will be understood within the context of the system 200, 240 illustrated with regard to FIGS. 6 and 7 valves may be utilised to regulate and proportion flows to the respective heat exchangers 220a-c and expanders 212a-c and 222. Thus, it may be possible to achieve more efficient operation. For example the heat exchanges 220a-c and/or the expanders 212a-c may be of different sizes to allow selective levels of pre-heating or to allow optimisation of driving force to the generator. It may be possible to switch compressed air flow dependent upon requirements and load requirement upon the generator. The compressed air held in the storage arrangement may be added or subtracted for storage from the current capacity defined by the compressor 208. By use of valves from the storage arrangement 214 it may be possible to alter the dwell time of the recovered stored compressed air from the arrangement 214 and so the increase in temperature prior to transmission to the expanders 212a-c. Thus, the systems 200, 240 can compensate for low wind or insufficient wind to drive the systems for demand on the generator or too high a wind for current load requirements on the generator by storing capacity in the arrangement 214.

Various modifications may be made to the above examples, as follows.

For example, it is well known that when the wind energy converter is designed to extract power from a certain maximum wind speed, a certain torque-speed characteristic will be in place. This torque-speed characteristic is not optimal for all wind-speeds. For turbines driving generators, it is straightforward to select the optimal torque-speed characteristic to extract the most energy from the wind at that wind speed. In the wind energy converters of FIGS. 1 to 3, one means by which this flexibility could be achieved would be to have a number of movable mass members associated with each blade member (or pair of blade members). By having, for example, five discrete and identical systems per blade member (or blade member-pair), one could obtain torque-speed characteristics which were 20%, 40%, 60%, 80% and 100% of the rated characteristic. By having, for example, four discrete but non-identical systems per blade member, one could obtain any integer up to 15 times a unit rated characteristic. Alternatively, or additionally, one might elect to allow the turbine to have one free revolution in every, for example, p revolutions as a means of allowing it to build up kinetic energy again.

Having a permanent-magnet sliding-mass acting on a fixed stator rod within each turbine-blade is easy to conceive.

The matter of bending moments at the blade-roots is important, and these bending moments are extremely important in the design of the blade members and hub. The bending-moments have components in two different planes r-θ and r-z. In the traditional turbine designs, it is the bending moments in the r-θ plane which transmit the mechanical power from the blade members into the hub. In embodiments of the present invention, the power need not be transmitted in this way into the hub.

It is perfectly feasible to devise a blade-feathering strategy which could—in conjunction with embodiments of the present invention—maintain virtually zero bending moments at the blade roots in the r-θ plane whilst still delivering substantial power. In this case, the wind would be used to support the (circumferential component of the) weight of the blade members on both the rising and falling sides of the turbine. Initially, this might seem unusual because the forces being exerted by the wind on the falling side would actually be tending to slow down the turbine and the power being extracted would not be the maximum that could be extracted. However, it might very easily be the case that by managing the bending moments cleverly, the amount of power that can be extracted per unit investment in the machine can be increased dramatically.

The completion of the above scheme for managing blade root bending moments has to do with how bending moments in the r-z plane are managed. These transpire to be quite straightforward to react. The wind always attempts to blow the blade members backwards along the turbine axis. By having a horizontal column extending the nose cone to some non-trivial fraction of the length of each individual blade member, one could fix cable stays between the point of that column and the tips of the blades and the r-z plane bending moments would no longer be a significant concern.

It is recognised that when no wind is blowing, the turbine will be at rest with at least some blade members near horizontal. In this case, the self-weight of the blade members themselves must still be carried by an in-plane bending moment at the blade root.

Although FIGS. 1 to 3 show the blade members themselves having a straight axis, this is not necessary.

In the power generating system 200, 240, the compressor 208 could be driven by multiple drive arrangements, for example a combination of turbines driven by any combination of wind, wave or tidal power.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. A wind energy converter comprising
  a horizontal axis wind turbine including a plurality of blade members rotatable about a generally horizontal axis,
  some or all of the blade members having at least one mass member movable relative thereto under the action of radial forces induced by rotation of the blade members and under the action of gravitational force, wherein:
  movement of the or each mass member relative to an associated blade member or associated blade members is arranged to provide for conversion of the wind energy into a form of energy chosen from hydraulic, pneumatic, electrical, magnetic, and mechanical energy to be more transmissible than wind energy,
  the or each mass member is arranged on an associated blade member or associated blade members such that the centrifugal force associated with rotation of the blade members and the action of gravitational forces tend to move the center of mass of the or each mass member radially as the blade member rotates, between a maximum radially outer position of the center of mass and a maximum radially inner position of the center of mass, providing a conversion cycle driven by centrifugal and gravitational forces.

2. A wind energy converter according to claim 1, wherein the movement of the or each mass member under the action of radial force is arranged to move the or each mass member towards a tip of an associated blade member, and the movement of the or each mass member under the action of gravitational force is arranged to move the or each mass member away from the tip of a blade member.

3. A wind energy converter according to claim 1, wherein the wind energy converter includes means for applying a force to the mass member to overcome the radial forces and thereby initiate movement of the or each mass member from a maximum radially outer position.

4. A wind energy converter according to claim 1, wherein the blade members are hollow and define a cavity which is sealed at the tips of the blade members and the or each mass member is movable relative to a blade member through the cavity.

5. A wind energy converter according to claim 1, wherein the movement of the or each mass member through the cavity is arranged to compress a gas.

6. A wind energy converter as claimed in claim 1 wherein at a part of a cavity in one blade member is connected with a part of a cavity in another blade member.

7. A wind energy converter according to claim 1, wherein the or each mass member is in the form of a solid member or liquid.

8. A power generating system comprising:
  a wind energy converter according to claim 1 and operable to compress gas;
  a heat recovery arrangement operable to cool the compressed gas, the heat recovery arrangement comprising a heat exchanger arrangement operable to cool compressed gas from the compressor and an expander operable to partially expand cooled compressed gas from the heat exchanger;
  a storage arrangement for storing cooled compressed gas from the heat recovery arrangement; and
  an expander arrangement operable to expand compressed gas from the storage arrangement and/or from the expander to thereby drive a generator to generate electrical power.

9. A power generating system according to claim 8, wherein the heat recovery arrangement is operable to cool the compressed gas to a temperature substantially equal to the temperature externally of the storage arrangement.

10. A power generating system according to claim 9, wherein the storage arrangement is an underwater storage arrangement and the heat recovery arrangement is operable to cool the compressed gas to a temperature substantially equal to the temperature of the water surrounding the underwater storage arrangement.

11. A power generating system according to claim 10, wherein the underwater storage arrangement comprises a deformable storage tank defining a variable storage volume for storing cooled compressed gas from the heat recovery arrangement.

12. A power generating system according to claim 11, wherein the compressor is operable to adiabatically compress the gas.

13. A power generating system according to claim 11, wherein the system is operable to heat the compressed gas from the underwater storage arrangement and/or the expander prior to expansion in the expander arrangement.

14. A power generating system according to claim 13 wherein the system is operable to utilize heat recovered by the heat recovery arrangement to heat the compressed gas.

15. A power generating system according to claim 13, wherein the expander arrangement comprises a plurality of expansion stages, and the system is operable to heat the compressed gas after each expansion stage.

* * * * *